Patented July 11, 1950

2,514,427

UNITED STATES PATENT OFFICE 2,514,427

ADHESIVE COMPOSITIONS

Elmer R. Trimble, Lancaster, Pa., assignor to Armstrong Cork Company, Lancaster, Pa., a corporation of Pennsylvania No Drawing. Application March 31, 1948, Serial No. 18,289

10 Claims. (Cl. 260—28.5)

This invention relates to adhesive compositions. More particularly, the invention relates to an adhesive composition for use in bonding plastic flooring materials such as plastic compounds containing vinyl resins, linoleum, synthetic rubber compounds, and the like to various surfaces such as metal, concrete, wood, and the like.

In the laying of floor coverings, particularly plastic floor coverings, which term is employed generically to include linoleum as well as various floor covering materials containing vinyl resins, synthetic rubber, and the like, on subfloors such as metal, wood, and concrete, it is highly important that a rapid setting adhesive be used so that a bond is developed between the plastic flooring and the subfloor. The adhesive employed should be capable of being trowelled as this is the most widely used means of applying such adhesives to subfloors and, in addition, it should be resistant to cleaning preparations, including alkaline solutions, which are commonly employed in cleaning such flooring.

Various adhesives have been proposed in the art, and certain of these are excellent adhesives for obtaining a bond between a specific type of flooring such as linoleum and a specific subfloor such as a wood floor, but, generally speaking, such adhesives cannot be used to bond other plastic floorings, for example, vinyl resin floorings to wood or other subfloors. While a particular adhesive may result in the development of an excellent bond between, say, linoleum and wood, it may be entirely unsatisfactory for bonding a vinyl resin floor to wood or another subfloor.

In addition to the above characteristics, it is necessary that adhesive compositions to be used in laying floor coverings possess a definite time lag before loss of adhesion develops. In other words, the worker who is laying the floor must have sufficient time to position the goods properly before pressing them against the layer of adhesive. Adhesives which lose their tack too rapidly by too rapid evaporation of solvents therefrom present marked disadvantages.

I have found that an all-purpose adhesive composition may be prepared by combining a 70% chlorinated paraffin with a selected methacrylate resin in certain proportions to obtain an adhesive which is capable of bonding a wide variety of flooring materials such as linoleum, rubber flooring, rubber tile, felt base floor covering, plastic floor covering, and the like to various subfloors such as metal, for example, aluminum and steel; wood; concrete; and the like. The selected methacrylate resin is one of a group consisting of polyisobutyl methacrylate, poly n-butyl methacrylate, and resinous copolymers of isobutyl methacrylate and n-butyl methacrylate. These materials have been employed in the preparation of adhesives, and their method of preperation and characteristics need not be described herein as they are well known to workers skilled in the adhesive art. I combine with the selected methacrylate resin a 70% chlorinated paraffin. The ingredients are mixed in fairly specific proportions as, in order to obtain the above-discussed characteristics, particular proportions are essential. The methacrylate resin-chlorinated paraffin mixture contains 60% to 70% chlorinated paraffin and 30% to 40% selected methacrylate resin. Poor adhesion results when less than 60% chlorinated paraffin is used and a composition which is too viscous for practical application is obtained when more than 70% is employed. When less than 30% methacrylate resin is used, poor adhesion to metal results. When more than 40% methacrylate resin is used, a stringy composition results. I have obtained particularly advantageous results with an adhesive composition comprising a mixture containing about 2 parts by weight of chlorinated paraffin and about 1 part by weight of selected methacrylate resin. The methacrylate resin imparts improved adhesion to metal and such similar surfaces while the chlorinated paraffin also possesses adhesive properties. The combination of the two materials in the proportions indicated results in an adhesive which may be used to bond a wide variety of materials together as discussed hereinabove.

In addition to these ingredients, I employ a solvent which is a mixture of an aromatic hydrocarbon such as toluol, xylol, and an alcohol having 3 to 5 carbon atoms, for example, isopropanol, butanol, and the like. This solvent combination is essential to obtain a solvent type adhesive as the aromatic hydrocarbon is employed to dissolve the chlorinated paraffin and the alcohol is employed to dissolve the methacrylate resin. The solvent mixture advantageously contains about 50% by weight of each component although slightly higher or slightly lower percentages of each component may be present. Generally speaking, sufficient solvent is employed to accomplish solution of the resin-paraffin mixture.

In addition to the above ingredients, I find it advantageous to utilize a plasticizing agent which may be any one of a number of plasticizers. Advantageous results have been obtained with alkali-resistant plasticizers such as tricresyl phosphate, dioctyl phthalate, 40% chlorinated paraffin, and the like.

In order to obtain a material which is capable of being trowelled, it is necessary to incorporate a suitable filler in the composition. Any one of a number of fillers such as the various clays may be utilized. I have obtained particularly advantageous results utilizing a mixture of a fat clay such as chicora clay and a lean clay such as kingsley clay, kaolin, and the like. These fillers are all well known to workers in the adhesive art, and a more complete description of them is believed to be unnecessary. Generally speaking, a mixture containing 50% by weight fat clay and 50% by weight lean clay results in a composition of the proper consistency for trowelling.

If desired, a wetting agent such as morpholine may be added to any adhesive composition to improve the bond of materials containing certain types of paint coatings on the under surface. For example, certain types of floor coverings are manufactured with a backing of a protein paint, such as casein paints, soya bean protein paints, and the like, and agents such as morpholine have a solvent effect upon such backing paints thereby enabling the development of a good bond between a subfloor and a floor covering carrying such a backing paint.

In order to more fully understand my invention, reference may be had to the following specific examples.

*Example I*

An adhesive composition was prepared from the following ingredients:

| | Per cent |
|---|---|
| Toluol | 10.70 |
| Isopropanol | 10.70 |
| Tricresyl phosphate | 3.22 |
| Copolymer of isobutyl methacrylate and n-butyl methacrylate | 10.70 |
| 70% chlorinated paraffin | 21.40 |
| Chicora clay | 43.28 |

Compositions prepared in accordance with this example were used to adhere linoleum to pine slats, steel, and aluminum. Pull tests were conducted at the end of 1, 4, and 7 days and indicated no significant loss of bond.

*Example II*

A composition was prepared from the following ingredients in the following proportions:

| | Per cent |
|---|---|
| Toluol | 10.70 |
| Isopropanol | 10.70 |
| Tricresyl phosphate | 3.22 |
| Copolymer of isobutyl methacrylate and n-butyl methacrylate | 10.70 |
| 70% chlorinated paraffin | 21.40 |
| Chicora clay | 21.64 |
| Kingsley clay | 21.64 |

This adhesive composition was applied to linoleum, pine slats, aluminum, and steel. Pull tests indicated substantially no loss in bond over a period of 7 days.

*Example III*

An adhesive composition was prepared containing the following ingredients in the following proportions:

| | Per cent |
|---|---|
| Toluol | 10.49 |
| Isopropanol | 10.49 |
| Tricresyl phosphate | 3.18 |
| Morpholine | 1.96 |
| Copolymer of isobutyl methacrylate and n-butyl methacrylate | 10.49 |
| 70% chlorinated paraffin | 20.97 |
| Chicora clay | 21.21 |
| Kingsley clay | 21.21 |

This adhesive was used to adhere a felt base product having a backing paint and an excellent bond was obtained.

Each of the adhesives set forth in the above examples were subjected to water, soap, and a 5% solution of caustic soda; and the films of adhesive withstood all these types of solutions, thus indicating that the adhesive possesses resistance to water, soap solutions, and alkali.

The adhesives of my invention are particularly adapted for use in bonding various types of flooring materials to subfloors. However, they may also be used in the installation of wall coverings and to adhere desk tops, counter tops, sink tops, and the like to any type base material.

While I have described my invention with reference to certain particular embodiments, it is understood that the invention is not limited thereby. Therefore, changes, omissions, substitutions and/or additions may be made without departing from the spirit of the invention as defined in the appended claims which are intended to be limited only as required by the prior art.

I claim:

1. An adhesive composition comprising a mixture containing 60% to 70% by weight of 70% chlorinated paraffin and 30% to 40% by weight of a methacrylate resin selected from the group consisting of polyisobutyl methacrylate, poly n-butyl methacrylate, and copolymers of n-butyl methacrylate and isobutyl methacrylate, and a solvent for the components of said mixture.

2. An adhesive composition comprising a mixture containing 60% to 70% by weight of 70% chlorinated paraffin and 30% to 40% by weight of a methacrylate resin selected from the group consisting of polyisobutyl methacrylate, poly n-butyl methacrylate, and copolymers of n-butyl methacrylate and isobutyl methacrylate, and a solvent for the components of said mixture including an aromatic hydrocarbon and an alcohol having 3 to 5 carbon atoms.

3. An adhesive composition comprising a mixture containing 60% to 70% by weight of 70% chlorinated paraffin and 30% to 40% by weight of a methacrylate resin selected from the group consisting of polyisobutyl methacrylate, poly n-butyl methacrylate, and copolymers of n-butyl methacrylate and isobutyl methacrylate, a solvent for the components of said mixture including an aromatic hydrocarbon and an alcohol having from 3 to 5 carbon atoms, and a filler.

4. An adhesive composition comprising a mixture containing 60% to 70% by weight of 70% chlorinated paraffin and 30% to 40% by weight of a methacrylate resin selected from the group consisting of polyisobutyl methacrylate, poly n-butyl methacrylate, and copolymers of n-butyl methacrylate and isobutyl methacrylate, a solvent for the components of said mixture including an aromatic hydrocarbon and an alcohol having 3 to 5 carbon atoms, and a filler including a lean clay and a fat clay.

5. An adhesive composition comprising a mixture containing 60% to 70% by weight of 70% chlorinated paraffin and 30% to 40% by weight of a methacrylate resin selected from the group consisting of polyisobutyl methacrylate, poly n-butyl methacrylate, and copolymers of n-butyl methacrylate and isobutyl methacrylate, a solvent for the components of said mixture including a mixture of about 50% by weight of an aromatic hydrocarbon and about 50% by weight of an alcohol having 3 to 5 carbon atoms, and a filler including a mixture of about equal parts by weight of a lean clay and a fat clay.

6. An adhesive composition comprising about 2 parts by weight of 70% chlorinated paraffin and about 1 part by weight of methacrylate resin selected from the group consisting of polyisobutyl methacrylate, poly n-butyl methacrylate, and copolymers of n-butyl methacrylate and isobutyl methacrylate, a solvent for the components of said mixture including about equal parts by weight of an aromatic hydrocarbon and an alcohol having 3 to 5 carbon atoms and a filler including about equal parts by weight of a lean clay and a fat clay.

7. An adhesive composition comprising a mixture containing 60% to 70% by weight of 70% chlorinated paraffin and 30% to 40% by weight of a methacrylate resin selected from the group consisting of polyisobutyl methacrylate, poly n-butyl methacrylate, and copolymers of n-butyl methacrylate and isobutyl methacrylate, a solvent for the components of said mixture including about equal parts by weight of an aromatic hydrocarbon and an alcohol having 3 to 5 carbon atoms, a filler, and a wetting agent.

8. An adhesive composition comprising a mixture containing about 2 parts by weight of 70% chlorinated paraffin and about 1 part by weight of a methacrylate resin selected from the group consisting of polyisobutyl methacrylate, poly n-butyl methacrylate, and copolymers of n-butyl methacrylate and isobutyl methacrylate, a solvent for the components of said mixture including a mixture of an aromatic hydrocarbon and an alcohol having 3 to 5 carbon atoms, morpholine, and a filler.

9. An adhesive composition comprising a mixture containing 60% to 70% by weight of 70% chlorinated paraffin and 30% to 40% by weight of a copolymer of n-butyl methacrylate and isobutyl methacrylate, a solvent for the components of said mixture including an aromatic hydrocarbon and an alcohol having 3 to 5 carbon atoms, and a filler.

10. An adhesive composition consisting of the following ingredients in the following proportions by weight:

| | Per cent |
|---|---|
| Toluol | 10.49 |
| Isopropanol | 10.49 |
| Tricresyl phosphate | 3.18 |
| Copolymer of isobutyl methacrylate and n-butyl methacrylate | 10.49 |
| 70% chlorinated paraffin | 20.97 |
| Morpholine | 1.96 |
| Chicora clay | 21.21 |
| Kingsley clay | 21.21 |

ELMER R. TRIMBLE.

REFERENCES CITED

The following references are of record in the file of this patent:

UNITED STATES PATENTS

| Number | Name | Date |
|---|---|---|
| 2,232,595 | Dittmar et al. | Feb. 18, 1941 |

OTHER REFERENCES

"Clorafin" by Hercules Powder Company (pages 6 to 8), Wilmington, Delaware, 1944.